Feb. 23, 1937.  E. M. SHANNON  2,071,363
POWER REVERSE GEAR
Filed April 20, 1933   2 Sheets-Sheet 1
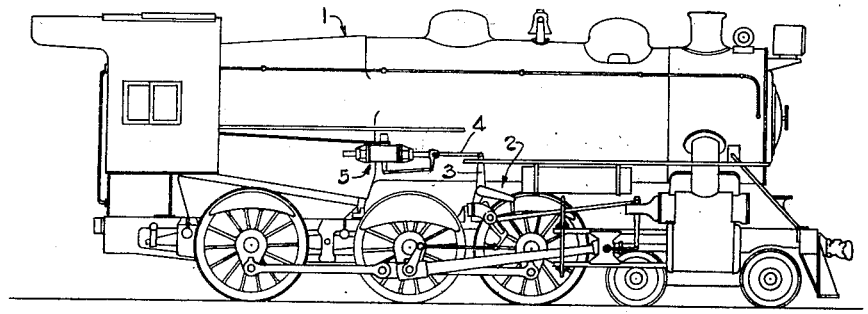
Fig.1
Fig.3
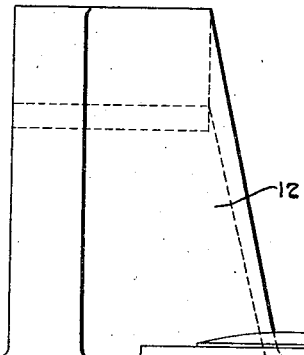
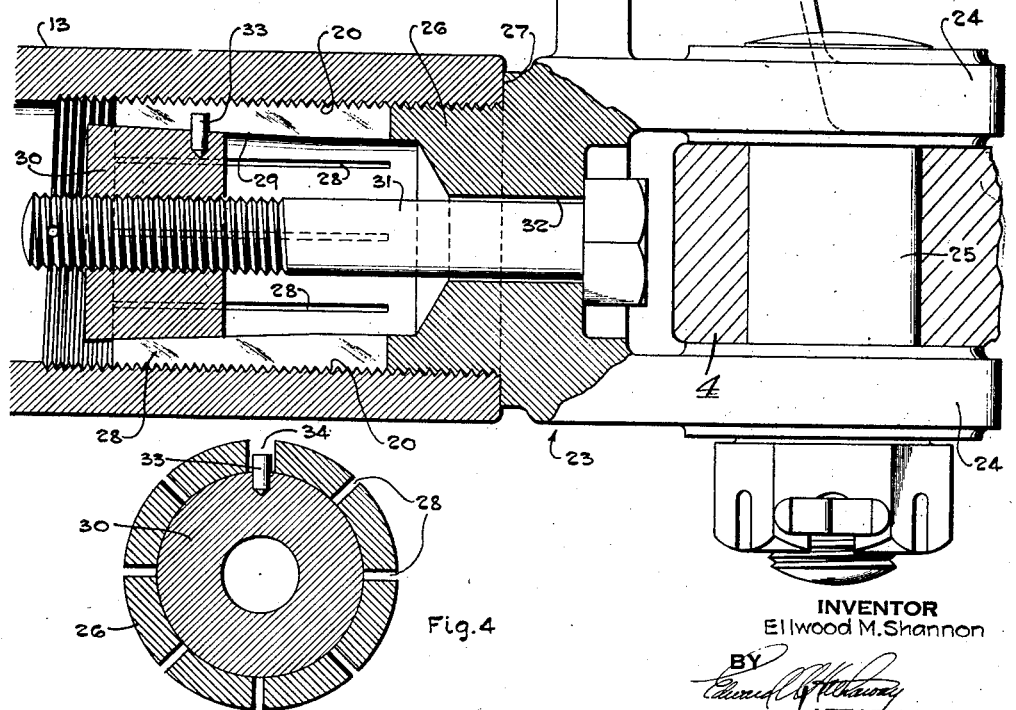
Fig.4
INVENTOR
Ellwood M. Shannon
BY
ATTORNEY Feb. 23, 1937. E. M. SHANNON 2,071,363
POWER REVERSE GEAR
Filed April 20, 1933 2 Sheets-Sheet 2
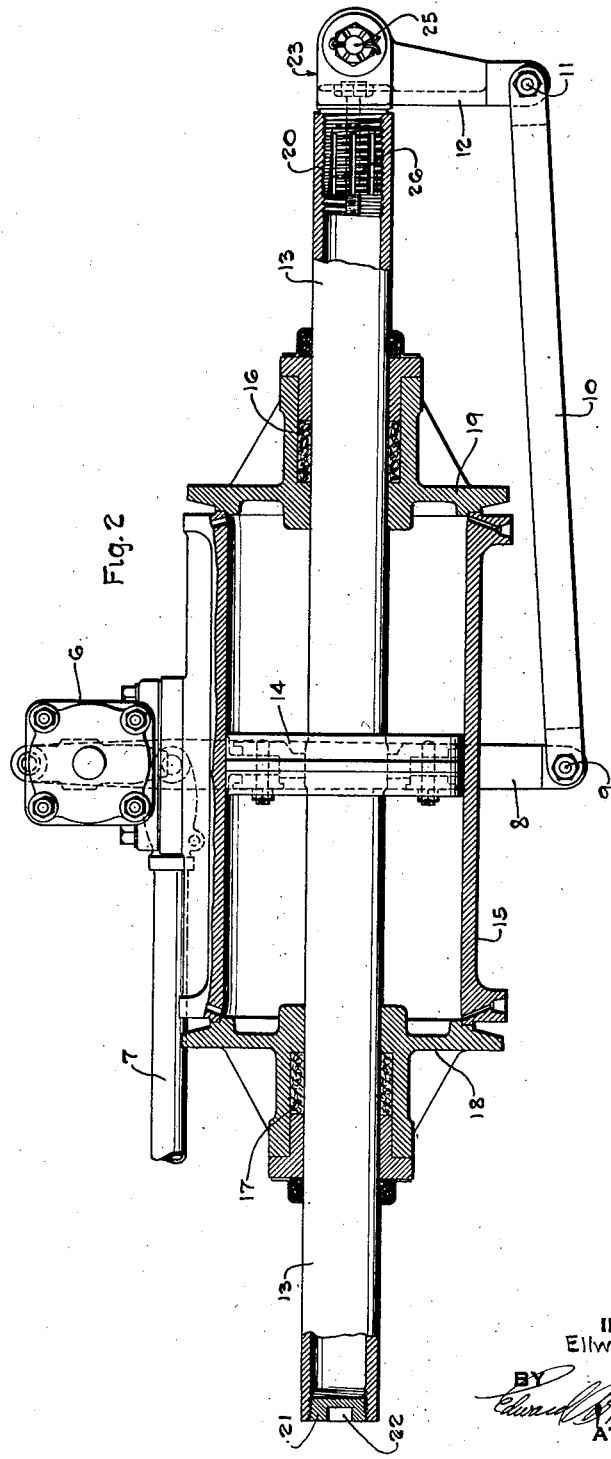
INVENTOR
Ellwood M. Shannon
BY
ATTORNEY Patented Feb. 23, 1937

2,071,363

UNITED STATES PATENT OFFICE 2,071,363

POWER REVERSE GEAR

Ellwood M. Shannon, Bala, Pa.

Application April 20, 1933, Serial No. 667,033

4 Claims. (Cl. 121—38)

This invention relates generally to power reverse gears for operating the valve gears of locomotives and more particularly to an improved combination for facilitating the removal of certain elements of a power reverse motor.

A power reverse motor of the reciprocating piston type such as herein disclosed has its piston rod pivotally connected to suitable linkages for shifting the locomotive valve gear and there is also attached to the piston rod a suitable arm and links forming a follow-up or restoring mechanism for returning to neutral the fluid distributing valve of the power reverse motor. This equipment forms a relatively compact unit closely assembled adjacent the locomotive boiler or other equipment, and hence simple and effective means are desirable to permit various elements of this equipment to be assembled or removed for purposes of repair or inspection. More specifically the particular element which is removed is a head or jaw forming the pivotal connection and arm, this head being supported on the end of the piston rod and so arranged that it may be easily removed from the rod without disturbing an excessive number of parts, and when it is so removed then the piston and rod may also be removed for inspection or repair if desired.

It is one object of my invention to accomplish the foregoing desired advantages in a simple, economical and effective manner. In one specific aspect of the invention I accomplish the foregoing object by providing a connecting element or head removably supported by the piston rod together with suitable means whereby the piston rod and piston may be rotated, preferably from the opposite end of the motor, so as to effect removal of said element thereby avoiding the necessity of rotating the element itself in the relatively small space in which it is usually disposed, this space under certain conditions being too small even to permit rotation of the arm.

A still further object is to provide improved means for holding said connecting element in its assembled position. In one aspect of the invention said element is provided in the form of a jaw or a combined arm and pivot having threaded engagement with the rod.

Other objects and advantages will be more apparent to those skilled in the art from the following description of the accompanying drawings in which:

Fig. 1 is a side elevation of a locomotive employing my improved invention;

Fig. 2 is an enlarged longitudinal section, parts of which are in elevation, of a power reverse motor with my improvements embodied therein;

Fig. 3 is an enlarged plan view of one end of the piston rod and connecting head therefor;

Fig. 4 is a transverse section taken on the line 4—4 of Fig. 3.

In the specific embodiment of the invention which is shown herein merely for purposes of illustrating the principle thereof and of disclosing one specific form among possible others that the invention might take, I have shown the invention as applied to a locomotive generally indicated at 1 and having a valve gear mechanism generally indicated at 2 provided with a usual reversing arm 3. This reversing arm is pivotally connected to a suitable link 4 which in turn is connected to a power reverse motor generally indicated at 5.

The operation of the power reverse motor and its control is well-known and hence it will suffice to state that any usual or suitable type of distributing valve generally indicated at 6, Fig. 2, may be controlled from the cab by a link 7 while a follow-up or restoring mechanism for the valve mechanism 6 includes a floating lever 8 pivotally connected at 9 to a link 10 which in turn is pivotally connected at 11 to an arm 12 projecting downwardly from a piston rod 13. The piston rod and its piston 14, disposed in a power reverse motor cylinder 15, may be of any desired construction but is herein shown as having a piston rod of uniform diameter throughout the length of each end thereof. The rod extends through any suitable adjusting packing glands 16 and 17 supported in removable cylinder heads 18 and 19.

The piston rod is preferably but not necessarily hollow and is provided with threads at one end herein shown as being internal threads 20 although as will be seen later, in certain aspects, the invention could be employed with external threads if desired. The other end of the hollow rod is provided with a preferably nonremovable plug 21 having preferably a square opening 22.

Removably supported in the threaded end 20 is a head or connecting element 23 which has a bifurcated end or jaw 24 provided with a removable pivot pin or bolt 25 to which the link 4, Fig. 1, is pivotally connected. The arm 12 also projects downwardly and slightly inwardly from head 23 while a threaded shank 26 is adapted to have engagement with threads 20 of the piston rod. A shoulder 27 formed on the head normally fits tightly against the end of the rod but to insure that the head and rod will be tightly held under all possible service conditions where vibration and other loosening forces are present, I have formed the inner end of shank 26 with a series of slots 28 to permit radial expansion of said inner end. To effect this expansion the shank is provided with a tapered bore 29 to receive a complementary tapered expanding plug 30 which is adapted to be moved axially of bore 29 by a bolt 31 which extends inwardly through a suitable bore 32 and has threaded engagement with said plug. To prevent rotation of plug 30, a pin 33 is carried thereby and slides within an enlarged groove 34 formed in the shank 26.

*Operation.*—Assuming that the power reverse motor 5 is mounted on the side of the locomotive and connected to the necessary control and operating linkages, then should it be desired to remove head 23 or to remove piston 14, to replace the packing or inspect the same, the bolt 31, Fig. 3, is loosened by a suitable wrench, pivot pin 25 being first removed if necessary. After bolt 31 is loosened, its head may be hit with a hammer so as to axially move expanding plug 30 in a left hand direction, thereby releasing the radial holding force between the threads of shank 26 and the internal threads 20 of the piston rod. By now rotating piston rod 13 and its piston 14 therewith, shank 26 may be unscrewed from the end of rod 13 without necessitating rotation of head 23, thus permitting the head and its arm 12 to be placed closely adjacent other elements which would normally prevent rotation of the arm. The piston rod may be rotated by obtaining a suitable hold thereon in any desired manner but in one preferred form the squared opening 22, Fig. 2, will permit the insertion of a suitable wrench to effect the necessary rotation of the rod. With head 23 unscrewed, and irrespective of whether the head and its arm 12 may be rotated by itself, it will be noted that my improved combination will permit piston 14 to be removed from the left end of cylinder 15 merely by removing cylinder head 18. The packing gland 16 will not obstruct movement of the right end of piston rod 13 as the rod is of uniform diameter throughout and the head 23 is secured thereto preferably on the inside thereof, although it is readily observed that by having an external threaded engagement and with the outside diameter of such threads not greater than the uniform diameter of the rod, the rod may likewise be moved through the gland 16.

In a converse manner the various elements of the power reverse motor and linkages may be assembled either during installation of the equipment or after repair or inspection. In any case, however, it is seen that I have provided a relatively simple means of positively holding all of the various elements in their proper operative relation and yet will permit the same to be easily and readily assembled as above indicated.

It will of course be understood that under certain conditions it may be desirable to allow arm 12 and jaw or head 23 to be removed from the piston rod 13 (after the wedge 30 has been driven loose from shank 26) by rotating the jaw or head 23 while the piston rod is held from turning, in any suitable manner, preferably by a wrench inserted in the square 22.

It will also be understood that various changes may be made in the details of construction and arrangement of parts without departing from the spirit of the invention as set forth in the appended claims.

I claim:

1. A power reverse gear comprising, in combination, a cylinder having cylinder heads at each end, packing glands carried by each of said heads, a piston and a double end piston rod extending entirely through said heads and surrounded by the packings thereof, one end of said rod having a threaded hollow portion and a smooth periphery, a head having a radially expansible internally tapered hollow shank in threaded engagement with the interior of said hollow threaded end of the rod, a complementary tapered plug disposed within said tapered shank, a bolt having threaded engagement with said plug and extending through said head to be axially accessible from the outside whereby rotation of said bolt will cause said plug to be moved axially of said shank and expand the same to tighten said threaded engagement, a jaw extending axially of said head, a pivot pin extending transversely of said jaw and substantially in the path of said bolt whereby the bolt is removable only upon removal of said pivot pin, and an arm projecting downwardly and laterally from one side of said head for operative connection to a follow-up link, whereby said bolt is accessible from opposite sides of said jaw.

2. A power reverse gear comprising, in combination, a cylinder having a cylinder head and packing gland therefor, a piston rod having a smooth periphery throughout its length and terminating in a threaded hollow end, a head having an axially extending but radially expansible hollow tapered shank in threaded engagement with the threaded interior hollow end of said rod, a complementary tapered plug disposed in said tapered shank, a bolt having threaded engagement with said plug and extending through said head whereby rotation of said bolt will cause said plug to be moved axially of said shank and expand the same to tighten said threaded engagement, a jaw projecting substantially axially of said shank on opposite sides of said bolt, a pivot pin disposed transversely of said jaw, a connecting rod attached to said pin, said rod and pin being disposed at a point in advance of said bolt so as to prevent displacement thereof during normal operation of the reverse gear, and an arm projecting downwardly from said head as a fixed part thereof, said head being removable from said piston rod without change in the exterior of said rod whereby said piston rod may be moved entirely through said packing gland without injuring the same.

3. In a power take-off for a power reverse gear comprising a head having a radially expansible internally tapered hollow shank adapted for threaded engagement with the interior of a hollow piston rod, a complementary tapered plug disposed within said tapered shank, a bolt having threaded engagement with said plug and extending through said head to be accessible from the outside whereby rotation of said bolt will cause said plug to be moved axially of said shank and expand the same to tighten its threaded engagement with a hollow rod, a jaw extending axially of said head, a pivot pin extending transversely of said jaw in substantially the path of said bolt whereby the bolt is removable only upon removal of said pivot pin, and an arm projecting downwardly and laterally from one side of said head for operative connection to a follow-up link whereby said bolt is accessible from opposite sides of said jaw.

4. A power take-off for a power reverse gear comprising head having an axially extending but radially expansible hollow tapered shank adapted for threaded engagement with the interior of a hollow rod, a complementary tapered plug disposed in said tapered shank, a bolt having threaded engagement with said plug and extending through said head whereby rotation of said bolt will cause said plug to be moved axially of said shank and expand the same to tighten its threaded engagement with a rod, a jaw projecting substantially axially of said shank on opposite sides of said bolt, a pivot pin disposed transversely of said jaw, a connecting rod attached to said pin, said rod and pin being disposed at a point in advance of said bolt so as to prevent displacement thereof during normal operation of a reverse gear, and an arm projecting downwardly from said head as a fixed part thereof.

ELLWOOD M. SHANNON.